Sept. 16, 1958
R. MARTINES
2,852,755
ELECTRIC TERMINAL
Filed Dec. 22, 1954
2 Sheets-Sheet 1
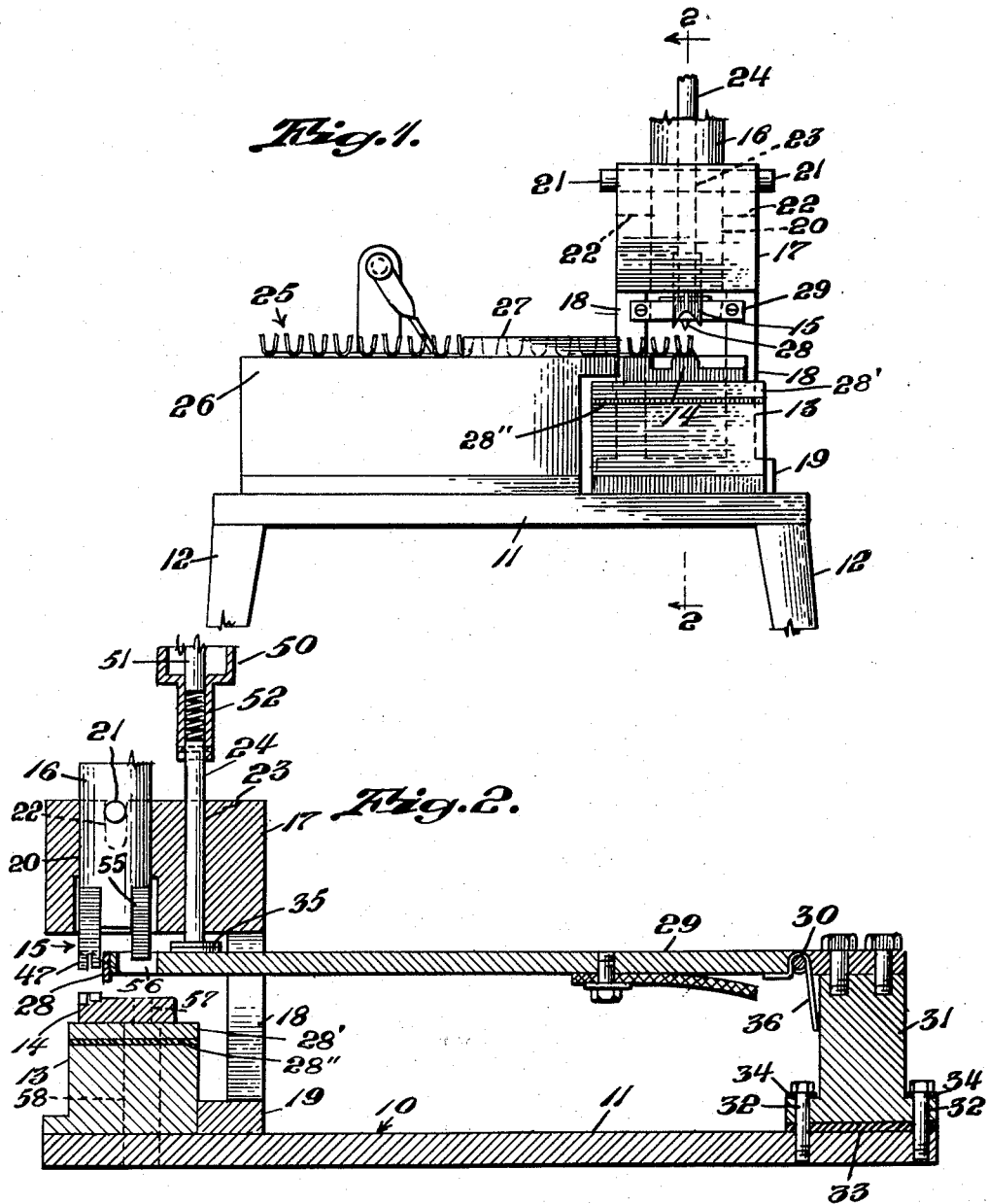
INVENTOR.
Rene Martines
BY
Barlow & Barlow
ATTORNEYS.

Sept. 16, 1958 R. MARTINES 2,852,755
ELECTRIC TERMINAL
Filed Dec. 22, 1954 2 Sheets-Sheet 2
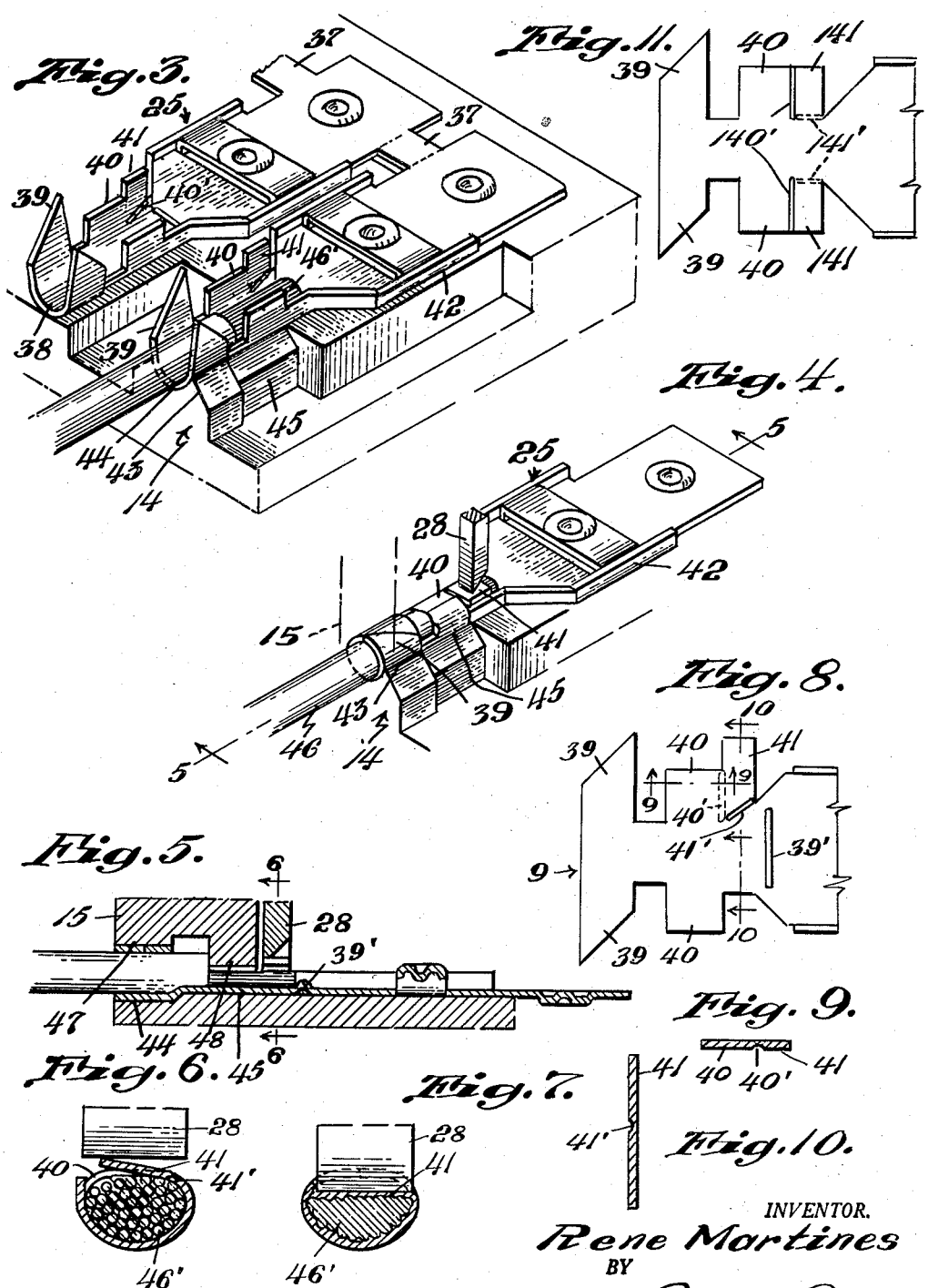
INVENTOR.
Rene Martines
BY
Barlow & Barlow
ATTORNEYS.

United States Patent Office 2,852,755
Patented Sept. 16, 1958

2,852,755
ELECTRIC TERMINAL

Rene Martines, Warwick, R. I., assignor to The Crimpweld Corporation, a corporation of Rhode Island Application December 22, 1954, Serial No. 476,975

4 Claims. (Cl. 339—275)

This invention relates to an electrical terminal and the method of attaching an electric conductor thereto by welding, particularly a multistrand conductor, and is a continuation in part of my application Serial No. 406,659, filed January 28, 1954, now abandoned.

A usual welding procedure for securing the end strands of a multistrand electric conductor to an electrical terminal plasticizes the wire strands by a direct contact of a welding electrode on the strands and while the strands are in a plastic, softened condition, the electrode strikes a blow on the strands to smash the same on the terminal. This is done to insure that each and every wire strand is plasticized and attached to each other and the material of the terminal. The impact of the electrode on the plasticized strands forms a groove across the strands which reduces the thickness and weakens the strands at the location of the weld which is, of course, undesirable.

An object of the invention is to weld an electric conductor to an electrical terminal in a manner so as to localize the heat generated in the welding operation to substantially the area at which the weld connection is made.

Another object of the invention is to weld an electric conductor to an electrical terminal in a manner to avoid weakening of the wire strand at the location of the weld.

Another object is to weld an electric conductor to an electrical terminal through an intermediate piece of metal which contacts the wire strand.

A more specific object of the invention is to provide an electric terminal for an insulated conductor in which the terminal will be provided with a welding tab which is isolated from the body of the terminal in such a manner that the resistance heating of the tab will be localized at a predetermined area between the tab and body of the terminal.

With these and other objects in view, the invention consists of certain novel features of construction as will be more fully described and particularly pointed out in the appended claims.

In the accompanying drawings:

Figure 1 is a front elevational view of a machine particularly adapted for attaching electrical conductors to electric terminals;

Figure 2 is a sectional view taken substantially along line 2—2 of Figure 1;

Figure 3 is a perspective view of two connected electric terminals with one of the terminals at a position on the lower rolling tool for the bending operation of the arms of the terminal about the wire strands in the wire receiving channel of the terminal;

Figure 4 is a similar view but showing only the terminal acted upon, illustrating the arms as having been wrapped about the wire strands and a welding electrode in contact with the terminal;

Figure 5 is a sectional view taken along line 5—5 of Figure 4 and showing the upper die of the rolling tool in the closed position thereof and the welding electrode in engagement with the welding tab;

Figure 6 is a section taken along line 6—6 of Figure 5;

Figure 7 is a similar view but showing the parts in different relation;

Figure 8 is a plan view of a fragmentary portion of a blank for forming the terminal embodying my invention;

Figure 9 is a sectional view taken substantially along line 9—9 of Figure 8;

Figure 10 is a sectional view taken substantially along line 10—10 of Figure 8; and Figure 11 is a plan view of a fragmentary portion of a blank for forming a modified terminal.

The invention is shown embodied in an electric terminal of the type wherein the electric conductor is adapted to be attached to the terminal by a machine operation. Accordingly, the terminal is preferably made in strip form wherein each terminal is attached to the other to be fed to the rolling tools and severed from the strip during the operation of bending or wrapping the arms of the terminal about the electric conductor. The terminals are made from strip stock which is subjected to a series of scoring, severing, piercing, and bending operations, which result in a strip of connected terminals, each comprising a body having pairs of adjacent arms which extend generally parallel to each other and form therebetween a channel to receive the end of the electric conductor. The end of a single strand or multi-strand conductor is positioned in the channel and the outer pair of said pairs of arms is bent and crimped about the insulation of the conductor and the other or inner pair of arms bent and crimped about the wire or wire strands which have been freed of insulation so as to provide for electric connection between terminal and conductor.

A welding tab is formed at the inner edge of one of the inner pair of arms. This tab is in effect a continuation of the arm widthwise thereof and is defined at the side adjacent to the arm by a score line which reduces the thickness of the stock at the junction of the arm and tab. The inner end of the score line is joined by a second score line which is made to extend in a generally lateral direction to an outer edge of the terminal body. This second score line likewise reduces the thickness of the stock at the junction of the tab and body of the terminal and mechanically weakens the tab at the reduced thickness to form a line at which the tab will bend over the wire of the conductor. In folding the inner pair of arms on the conductor, the tab, which is an integral part of one of the arms, will be carried therewith to extend at least above the end of the wire core of a conductor which is positioned in the channel and beyond the inner arms a distance substantially equal to the width of the said tab. Upon the initial bending of the tab above the wire core, the tab is engaged by a welding electrode to be further bent and engage the wire which is welded to the tab as will hereinafter appear.

In order to effect machine attachment of the conductors to the terminals, rolling tools are provided. These consist of lower dies in which the terminal is positioned and plungers which are lowered to engage and bend its arms into engagement with the conductor. The dies are placed in electrical contact with one welding electrode. The other electrode is resiliently mounted in tandem relation with the plungers. The latter electrode is moved in timed relation with the plungers so that when the plungers engage and bend the arms a sufficient distance to place the tab in the path of the lowering electrode, the electrode will engage the tab, completing a circuit to the lower die, the welding circuit having been closed prior to engagement of the electrode with the tab. The score lines about the tab provide an increased resistance to the passage of the electric current at these locations by reason of the reduced thickness of the stock and effect a localized resistance heating at the score lines to cause a softening or plasticizing of the tab. The tab under the force exerted thereon by the electrode plus the softening and mechanical weakening at the score line will collapse to engage the wire of the conductor to flow thereabout and provide a direct path between electrodes for the flow of electric current. The resistance heating of the mass between electrodes will complete the welding in the known manner.

Because of this increased resistance to the flow of welding current across the score lines, the flow of current passing the score lines to other parts of the terminal is not such as to be sufficient to generate heat to a degree to melt or damage the insulation of the conductor between the outer arms of the terminal. Additionally, upon establishing a direct path of current flow between electrodes, there will be little tendency for the welding current to pass from one electrode to the other without going through the conductor, as such a path offers less resistance than through the terminal body, the score lines setting up a high resistance barrier. As a result, the heat conducted to the insulation is insufficient to melt or otherwise injure the insulation of the conductor. This reduction in heat is also aided by the large area of dissipation provided by the die adjacent the welding point. It will be observed that I provide for welding an electric conductor to a terminal at a location closely adjacent to the insulation of the conductor without weakening of the conductor or destroying the insulation thereon and in which the welding operation is performed substantially simultaneously with the bending of the arms of the terminal about the conductor. The welding operation above described is particularly adapted to welding the wires of a multi-strand conductor to a terminal.

Referring to Figures 1 and 2, there is illustrated a machine designated 10 particularly adapted for use for attaching an electrical conductor having a single or multistrand core to an electrical terminal. The machine, only so much of which is illustrated as is believed necessary for an understanding of the present invention, comprises a base 11 which may be conveniently supported on legs 12. A die holder 13 is mounted on the base 11 at a forward edge portion thereof and the lower die 14 of the rolling tool is mounted on the said die holder as by means of screws (not shown). The upper die 15 of the rolling tool is carried by a plunger 16 which is mounted for reciprocal movement in a guide 17 which overhangs the die 14 and extends forwardly from spaced uprights 18 formed integral with the guide 17 and extending from an integral foot portion 19 which is mounted on the base 11. The plunger 16 in the present instance is of cylindrical form and is prevented from turning in the bore 20 by means of pins 21 which extend diametrically through the plunger and engage the walls of aligned vertical slots 22 extending inwardly from the upper side of the head. The guide 17 also has a smaller vertical bore 23 in parallel relation with the bore 20 and rearwardly thereof to receive a second plunger 24 mounted for reciprocation in said bore for a purpose which will hereinafter appear.

The electrical terminals indicated generally 25 are advanced to the die 14, 15 by means of a feed which includes a platform 26 having guides 27 between which the terminals are moved. The feed mechanism is not shown and may comprise any appropriate feed which advances the terminal in a step-by-step fashion. The welding electrode 28 preferably made of tungsten is carried at the forward end of the electrode holder 29 which is hingedly connected as at 30 to a support 31 mounted on the base 11 by means of bolts 32 and electrically insulated from the base 11 in any suitable manner, as for example, by an insulating plate 33 positioned between the foot of the support 31 and base 11 and insulating washer 34 positioned between the head of the bolts 32 and the support 31. The holder 29 extends in the space between the upright 18 to adjacent the dies 14 and 15 to position the electrode 28 closely adjacent the said dies. An insulation plate 35 is attached to the holder 29 to be engaged by the end of the plunger 24, and the holder is biased into engagement with said plunger by means of a torsion spring 36 which acts between the holder 29 and the support 31. The other electrode 28' is held stationary between die holder 13 and die 14 and is electrically insulated from the holder as by means of an insulating plate 28''.

The electrical terminals 25 are made for practical manufacturing reasons in strip form, and the individual terminals are severed from the strip during the process of attaching the electrical conductor thereto. As is usual in making terminals in strip form from a strip of sheet metal, the steps required for cutting the blank and bending the same into a complete terminal are made in a progressive order, and each terminal is attached to the other by a neck 37 (see Figure 3). In forming the terminal, the strip of flat stock is progressively acted upon by punch and die operations to result in a blank as shown in Figure 8 having a body 9 provided with pairs of arms 39, 40 and a welding tab 41. The tab 41 is integral with the inner edge of one of the arms 40 and connected thereto by a reduced thickness of stock provided by a score line 40'. The tab 41 is connected to the body 9 by a similar reduced thickness of stock formed by a score line 41' which extends in a generally lateral direction from the lower end of the score line 40' to the junction of the other side of the tab with the body 9. Thus, there is formed a welding tab or isolated welding area closely adjacent to the inner arms 40. The pairs of arms 39 and 40 are bent up to form a wire receiving channel 38 having pairs of upright arms extending in tandem relation and spaced apart a substantial distance as shown so that the insulated end portion of the conductor will lie in the channel 38 adjacent to the arms 39 and the wire strands freed of insulation will extend in the channel a distance beyond the inner edges of arms 40 to engage against a stop 39' formed by a rib in the stock. The particular shape or form of the other portion 42 of the terminal may take any of several forms.

In the operation of securing an electrical conductor to a terminal, the strip terminals are advanced into position on the lower die 14. The forward portion 43 of die 14 has a recess 44 (Figure 5), the walls of which are made on the curvature of the channel 38 and the rear portion 45 of the die 14 has a similar recess (not shown) extending in continuation of the channel 38 but shallower and of smaller dimensions. Thus, the channel part of the terminal will nest into the said recesses when in position on the die 14. The end of a conductor 46, which may be a single strand or a multistrand conductor, the insulation of which has been removed to bare an end stretch of wire or wire strands as the case may be, is positioned between the pair of arms 39, 40, the bared wires being positioned between the arms 40 to extend inwardly to engage the stop 39' which will position the wire or wires opposite to the tab 41. As by way of example, the conductor herein shown is a multi-strand conductor and hereinafter will be so referred to. The upper rolling die or plunger 15 is divided at its lower end to form a die part 47 of appropriate shape for engaging and wrapping the pair of arms 39 about the insulation of the conductor and a die part 48 for engaging and wrapping the inner arms 40 about the wire strands (Figure 5). The die part 48 is made of a width equal to that of the arms 40 so as to engage only such portion of the arm 40 equal to the width of the die part 48. By reason of the tab 41 being integrally connected edgewise to the adjacent arm 40, in bending the said arm 40, the tab 41 will be folded therewith to overlie above the wire strands. The plunger 16 may be moved downwardly to close the die 14, 15 on the conductor as by means of an air cylinder (not shown) and which may be controlled by suitable valves in the air supply thereto in a known manner. As the die 15 approaches the arms of the terminal and starts bending the arms about the conductor, the small plunger 24 has started to move downwardly to move the electrode 28 into engagement with the tab 41 which has now been bent or folded to be in the path of the descending electrode 28 (see Figure 6). The timing of the cycle of operation of the machine is arranged so that as the dies close about the terminal, the electrode 28 is lowered to engage tab 41 and the electric circuit (not shown) is closed, the electrodes 28, 28' being connected into the said circuit in the known manner. The plunger 24 may be lowered in a known manner preferably by means of an air cylinder indicated generally 50 and having a stem 51 acting against a compression spring 52 positioned between the said stem and plunger 24. The force of the spring 52 is chosen to be less than the normal resistance to folding of tab 41 so that the spring 52 will be in compression as the plunger 24 moves the electrode 28 into contact with the said tab.

Upon the electrode engaging the tab 41, the same will be energized. Because of the increased resistance to the flow of current at the score lines, a concentration of resistance heating will take place at the score lines and cause a softening or plasticizing of the tab at the score line to a much greater degree than other areas of the terminal in the path of the welding current. The softening of the tab 41 at the score lines and the additional mechanical weakening thereof at score line 41' will under urge of the resilient force of plunger 24 collapse at the score line 41' (see Figure 7) to engage and flow about the wire strands 46'. Upon engagement of the tab 41 with the wire strands 46', a direct path will be established through the wire strands 46' between electrodes to complete the weld. As this point of the welding operation is reached, the electric current is shut off and the rolling tools, being at the end of their work stroke, are opened and rise to initial position. The electrode 28 likewise returns to initial position, thus completing a cycle of operation.

In Figure 11 I have shown a blank for a modified terminal. This modification is similar to the terminal above described with the exception that two welding tabs 141 are provided. These extend in continuation of the arms 40 and are isolated therefrom by score lines 140'. The tabs 141 are also isolated from the body of the terminal by score lines 141'.

It will be understood that the various mechanism and electric circuit of the machine will be coordinated in a manner to provide for the proper timing of the operation of the said various mechanisms so that the dies first roll the terminal and wire into a mechanical bond and then a welding operation is performed to additionally secure the terminal and conductor to each other.

As previously stated, the terminals are in strip form and severed from the strip during the attaching of the electric conductor to the terminal. To this end, a cutting tool 55 (Figure 2) is carried by the plunger 16 and extends therefrom to pass through an opening 56 provided in the electrode holder 29. The tool 55 operates in conjunction with the edges of a die opening 57 provided in the die 14 which is below the connecting neck 37 of the terminal (Figure 3) when the advanced terminal is in position on the die parts 43, 45. The cutting tool is arranged to engage the neck 37 prior to closing of the dies about the terminal and will sever the neck 37 from the strip in a known manner and thus free the terminal worked upon from the strip. The severed material drops from the die opening 57 into a larger opening 58 aligned with opening 56 to be deposited in a proper receptacle (not shown) below opening 56 for disposal.

I claim:

1. An electrical terminal comprising a sheet metal blank having portions bent up to form a wire receiving channel with a pair of oppositely disposed arms for wrapping about the wire core of an electrical conductor, a welding tab carried by one of said arms at one side thereof to extend across said wire at one side of the other of said arms, said one arm and said tab being integrally connected at the said one side by a portion of stock of reduced thickness.

2. The method of securing the end of the wire core of an electrical conductor to an electrical terminal by the use of rolling tools and a welding operation which comprises forming the terminal with a channel having a pair of arms for bending about said core, forming at one side of one of said arms and integral therewith a welding tab, providing score lines about the tab area of a depth to result in increased heating at said score lines, bending said arms about said wire core and at the same time bending said tab to lay above and not in contact with said wire core, applying a resilient force on said tab between a pair of welding electrodes in a direction tending to move said tab into engagement with the wire core, and during the application of said resilient force on said tab passing an electrical welding current between said electrodes and through the tab to cause a resistance heating of the tab to soften and cause it to collapse into engagement with said wire core under urge of said resilient force whereby establishing a direct path for the flow of current between said electrodes and through the tab and wire core to complete the welding operation.

3. In the process of welding the wire core of an electric conductor to an electric terminal having a pair of arms for bending about the said wire core, that improvement comprising forming a tab to one side of one of said arms, forming score lines between the tab and said one arm, bending said tab about the terminal when an electric circuit is established, said score lines being formed of a depth to increase the resistance at said score lines whereby the score lines will cause increased heating therealong when an electric circuit is established to said area.

4. The method of securing the end of the wire core of an electrical conductor to an electric terminal by the use of rolling tools in a welding operation which comprises forming a terminal with a channel having a pair of arms for bending about the said core, forming at one side of one of said arms and integral therewith a welding tab, providing score lines at the connecting boundaries of the tab, positioning the tab so that the area bounded by the score lines is above and not in electrical contact with the core, applying current to said tab between a pair of welding electrodes to cause localized resistance heating at the score lines to soften the tab along the score lines, and applying pressure to collapse the tab at the score lines and move the tab into electrical contact with the wire core to provide a direct path between the electrodes for the flow of current to weld the wire to the terminal.

References Cited in the file of this patent

UNITED STATES PATENTS

| | | |
|---|---|---|
| 994,744 | Hall | June 13, 1911 |
| 1,690,377 | Pugh | Nov. 6, 1928 |
| 2,164,553 | Tear | July 4, 1939 |
| 2,451,800 | Buchanan | Oct. 19, 1948 |
| 2,637,798 | Burge | May 5, 1953 |
| 2,684,421 | Hipple | July 20, 1954 |
| 2,716,684 | Barnes | Aug. 30, 1955 |